United States Patent

Shen et al.

[15] 3,674,875

[45] July 4, 1972

[54] THE TREATMENT OF INFLAMMATION

[72] Inventors: Tsung-Ying Shen, Westfield; William V. Ruyle, Scotch Plains; Bruce E. Witzel; Gordon L. Walford, both of Westfield, all of N.J.

[73] Assignee: Merck & Co., Inc., Rahway, N.J.

[22] Filed: April 20, 1970

[21] Appl. No.: 30,364

Related U.S. Application Data

[63] Continuation-in-part of Ser. No. 836,603, June 25, 1969.

[52] U.S. Cl. ........................... 424/285, 424/248, 424/267, 424/274, 424/275, 260/247.1, 260/247.2 B, 260/247.5, 260/247 F, 260/293.57, 260/315, 260/329 R, 260/329 S, 260/329 F, 260/329 AM, 260/332.1, 260/332.2 R, 260/332.3 P, 260/346.2 M

[51] Int. Cl. ........................................................ A61k 27/00

[58] Field of Search ........................... 424/275; 260/346.2 M

[56] References Cited

UNITED STATES PATENTS 2,453,105  11/1948  Wolthuis et al. ...............260/346.2 M
2,050,958   8/1936  Muth.............................260/346.2 M

*Primary Examiner*—Stanley J. Friedman
*Attorney*—Michael C. Sudol, Jr., Harry E. Westlake, Jr. and I. Louis Wolk

[57] ABSTRACT

This invention relates to new tricyclic carboxylic acid and ester derivatives and processes for their preparation. These compounds have anti-inflammatory, anti-pyretic and analgesic activity. Also included are claims for methods of treating inflammation using the carboxylic acid compounds of this invention.

3 Claims, No Drawings

THE TREATMENT OF INFLAMMATION

CROSS REFERENCE TO RELATED APPLICATIONS

This application is a continuation-in-part of our co-pending U.S. application Ser. No. 836,603 filed June 25, 1969, allowed

BACKGROUND OF THE INVENTION

The development of anti-inflammatory compounds in the past two decades has been the growth of a great many new drugs. Most of these have been steroids of the 11-oxygenated pregnane series. These, while highly effective, have the drawback of causing many side effects. There is a need in the market for equally effective compounds of non-steroidal structure having less side effects.

SUMMARY OF THE INVENTION

Generally, this invention relates to new substituted tricyclic carboxylic acid compounds and processes for preparing the same. These compounds are useful in that they have anti-inflammatory activity and are effective in the prevention and inhibition of edema, and granuloma tissue formation. In addition, some of them have a useful degree of anti-pyretic, analgesic, diuretic, anti-fibrinolytic and hypo-glycemic activity.

DESCRIPTION AND PREFERRED EMBODIMENTS

This invention relates to new substituted tricyclic carboxylic acid compounds and processes for producing the same. More specifically, this invention relates to substituted tricyclic carboxylic acids, esters, amides, anhydrides and non-toxic pharmaceutically acceptable salts thereof. Still more specifically, this invention relates to compounds having the following general formula:

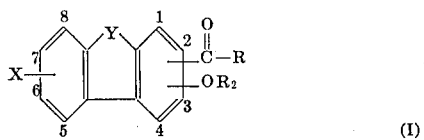

(I)

wherein

R is selected from the group consisting of hydroxy, amino, loweralkoxy (such as methoxy, ethoxy, butoxy, pentoxy, and the like) loweralkylamino (methylamino, propylamino, pentylamino and the like), di(loweralkyl)amino, (dimethylamino, dibutylamino, propylpentylamino, and the like) diloweralkylaminoloweralkoxy, hydroxyloweralkoxy, (3-hydroxypropoxy, 2-hydroxypropoxy, 4-hydroxybutoxy and the like), polyhydroxyloweralkoxy (2,3-dihydroxypropoxy, 2,3,4,5,6-pentahydroxyhexyloxy and the like), loweralkoxyloweralkoxy (ethoxyethoxy), aryloweralkoxy (benzyloxy, phenethoxy and the like, phenoxy, substituted phenoxy (such as loweralkoxyphenoxy, diloweralkylaminophenoxy and loweralkanoylaminophenoxy), carboxy and carboloweralkoxy, loweralkanoylaminoloweralkoxy, hydrazino, hydroxylamino, N-morpholino, N-(4-loweralkyl)piperidino, N-(4-hydroxyloweralkyl)-piperidino, and hydroxyloweralkylamino;

$R_2$ is selected from the group consisting of hydrogen, acyl (preferably loweracyl such as formyl, acetyl, propionyl, butryl, etc.) alkyl (preferably loweralkyl such as methyl, ethyl, propyl, isopropyl, butyl, pentyl, etc.), and alkoxycarbonyl (preferably loweralkoxycarbonyl such as methoxycarbonyl, ethoxycarbonyl, etc.);

X is selected from the group consisting of halogen (such as chloro, bromo, fluoro or iodo, preferably fluoro or chloro), alkyl (preferably loweralkyl such as methyl, ethyl, propyl, etc.), haloalkyl (preferably haloloweralkyl such as chloromethyl, trifluoromethyl, etc.) alkoxy (preferably loweralkoxy such as methoxy, ethoxy, isopropoxy, butoxy, etc.), hydroxy, amino, diloweralkylamino (preferably dimethylamino, dibutylamino, propylpentylamino, etc.), acylamino (preferably loweracylamino such as formylamino, acetylamino, propionylamino, butyrylamino, etc.), mercapto, alkylmercapto (preferably loweralkylmercapto such as methylmercapto, ethylmercapto, etc.), alkylsulfinyl (preferably loweralkylsulfinyl such as methyl sulfinyl, ethylsulfinyl, butylsulfinyl, etc.), alkylsulfonyl (preferably loweralkylsulfonyl such as methylsulfonyl, ethylsulfonyl, butylsulfonyl, etc.), sulfonamido, aminoalkyl (preferably aminoloweralkyl such as aminomethyl, aminoethyl, etc.), alkylaminoalkyl (preferably loweralkylaminoloweralkyl such as methylaminomethyl, ethylaminoethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), cyano, carboxy, carboalkoxy (carbomethoxy, carboethoxy, etc.), carbamyl, aryl (such as phenyl, tolyl, etc.), aralkyl (such as benzyl, phenethyl, etc.), aralkoxy, and aryl; and Y is selected from the group consisting of oxy, sulfo, sulfinyl, sulfonyl, amino, and alkylamino; provided that the $OR_2$ group and the

group are ortho to each other.

Representative compounds of this invention are as follows:
7-Fluoro-3-hydroxydibenzofuran-2-carboxylic acid;
7Chloro-2-hydroxydibenzothiophene-3-carboxylic acid;
8-Fluoro-3hydroxydibenzothiophene-2-carboxylic acid;
6-Fluoro-3-hydroxycarbazole-2carboxylic acid;
7-Methoxy-3-hydroxydibenzofuran-2-carboxylic acid;
7-Fluoro-3-hydroxydibenzothiophene-2-carboxylic acid;
7-dimethylamino-3-hydroxydibenzothiophene-2-carboxylic acid;
7trifluoromethyl-3-hydroxycarbazole-2-carboxylic acid;
8-fluoro-2-hydroxydibenzothiophene-3-carboxylic acid;
8-fluoro-2-hydroxydibenzofuran-3-carboxylic acid; and
7-fluoro-3-hydroxydibenzothiophene-2-carboxylic acid 5,5-dioxide.

This invention also relates to a method of treating inflammation in patients (animal or human) using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have anti-pyretic, analgesic, diuretic, anti-fibrinolytic and hypo-glycemic activity and would be administered and used in the same manner and in the same dosage ranges as if they were being used to treat inflammation as discussed further on.

The treatment of inflammation in accordance with the method of the present invention is accomplished by orally, rectally, parenterally, or topically administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension. Suppositories for rectal administration and gels for topical administration may be prepared in conventional manners.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be present in an amount of from 1 mg. to 100 mg./kg. body weight per day, preferably from about 2 mg. to about 5 mg. per kilogram body weight per day and especially from 4 mg. to 2 mg./kg. body weight per day. The most rapid and effective anti-inflammatory effect is obtained from oral administration of a daily dosage of from about 4 to 2 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The acid compounds of this invention may be prepared by carboxylating the appropriately substituted hydroxydibenzofuran, hydroxydibenzothiophene or hydroxycarbazole. This can be accomplished by heating the appropriately substituted above mentioned compound under pressure with carbon dioxide gas. The product can then be isolated from the reaction mixture by methods known in the art. The temperature at which the carboxylation reaction can take place is from 50° to 300° C. The reaction can also take place at from atmospheric pressure to high pressure, preferably however at 200° C., and at about 1,600 p.s.i. pressure.

The substituted hydroxydibenzofurans and hydroxydibenzothiophenes may be prepared by reducing the appropriately substituted nitrodibenzofurans or nitrodibenzothiophenes to the corresponding aminodibenzofurans and aminodibenzothiophenes and by further reacting the aminodibenzofurans and aminodibenzothiophenes with an alkali metal nitrite in the presence of a strong acid.

The hydroxydibenzofurans and hydroxydibenzothiophenes so prepared are then converted to the corresponding carboxylic acids as described above.

The hydroxycarbazoles may be prepared by forming the appropriately substituted 2-(2-nitrophenyl) benzoquinone. This may be accomplished by treating the appropriately substituted nitroaniline compound with an alkali metal nitrite in an acidic medium and reacting the resulting solution with benzoquinone in the presence of an alkali metal bicarbonate.

The resulting benzoquinone derivative is then reduced and ring-closed to form the appropriately substituted hydroxycarbazole which is then carboxylated to the corresponding carboxylic acid as described above.

The compounds of this invention wherein R is a group such that an ester is the final compound (i.e. R is alkoxy) are prepared by any esterification procedure using an esterifying agent containing the appropriate R group. For example, the carboxylic acid compounds of this invention may be reacted with the appropriate lower alkanol, (preferably methanol) at elevated temperatures in the presence of a strong acid such as hydrochloric acid, sulfuric acid, p-toluenesulfonic acid and the like to form the desired ester.

The compounds of this invention wherein R is a group such that an amide is the final compound (i.e. R is amino or substituted amino) may be prepared by any suitable amidation reaction. For example, the carboxylic acid compound (preferably the methyl or ethyl ester) may be reacted with ammonia, ammonium hydroxide, or an amino compound, at any suitable temperature (room temperature to reflux). When the amino group is desired, it is preferred to carry out the reaction with ammonia in a bomb at temperatures above 100° C. to form the desired R (amino) compound. Preferably, when an amide is desired which is derived from an amino acid, the following reaction sequence is followed: The carboxylic acid final compound is reacted with isobutyl chlorocarbonate to form the mixed anhydride. This compound is in turn reacted with the desired amino acid ester and subsequently hydrolyzed to form the desired amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhydride of this invention may be prepared by any of the well-known procedures in the art.

The following examples are presented to further illustrate the invention:

EXAMPLE 1

7-fluoro-3-nitrodibenzofuran

To an ice-cold solution of 7amino-3-nitrodibenzofuran (22.8 g., 0.10 mole) in aqueous 40 percent fluoboric acid (35 ml.) is added sodium nitrite (6.9 g., 0.10 mole), the solid being added slowly in small portions with vigorous stirring and continued ice-cooling. After a short time, the diazonium fluoborate is collected by filtration, and washed with a little fluoboric acid and then with alcohol and ether.

The diazonium fluoborate is suspended in high-boiling petroleum ether, and the suspension is warmed gently until decomposition is complete. The mixture is then evaporated in vacuo, and the residue crystallized from alcohol to give 7-fluoro-3-nitrodibenzofuran.

When 7-amino-2-nitrodibenzofuran and 8-amino-2nitrodibenzofuran are used in place of 7-amino-3-nitrodibenzofuran in the above example, 7-fluoro-2-nitrodibenzofuran and 8-fluoro-2-nitrodibenzofuran, respectively, are obtained.

EXAMPLE 2

7-fluoro-3-dibenzofuranamine

A mixture of 7-fluoro-3-nitrodibenzofuran (0.04 mole), stannous chloride dihydrate (0.18 mole), concentrated hydrochloric acid (40 ml.) and ethanol (20 ml.) is heated under reflux with stirring for 1 hour.

The mixture is then chilled thoroughly, the amine hydrochloride collected by filtration and washed with a little cold aqueous ethanol. The free 7-fluoro-3-dibenzofuranamine is liberated by neutralization with aqueous ammonium hydroxide. The amine is collected by filtration, and washed thoroughly with water.

When 2-nitrodibenzofuran-7-carboxylic acid, 7-fluoro-2-nitrodibenzofuran, 8-bromo-2nitrodibenzofuran, 8-fluoro-2-nitrodibenzofuran, 6-bromo-3-nitrodibenzofuran, 6-chloro-3-nitrodibenzofuran, 7-bromo-3-nitrodibenzofuran, 7-chloro-3-nitrodibenzofuran and 3-nitrodibenzofuran-9-carboxylic acid are used in place of 7-fluoro-3-nitrodibenzofuran in the above example, the corresponding substituted 2- and 3-dibenzofuranamines, respectively, are obtained.

EXAMPLE 3

7-fluoro-3-dibenzofuranol

To a stirred, ice-cold solution of 7-fluoro-3-dibenzofuranamine (0.010 mole) in acetic acid (20 ml.) and water (60 ml.) are added successively concentrated sulfuric acid (2 ml.) and a solution of sodium nitrite (0.015 mole) in water (10 ml.). The mixture is allowed to warm to room temperature, and then is heated gradually to 80° C. and held at that temperature until evolution of nitrogen ceases.

The mixture is chilled thoroughly, and 7-fluoro-3-dibenzofuranol is collected by filtration, washed well with cold water, and recrystallized from aqueous alcohol.

When 2-dibenzofuranamine-6-carboxylic acid, 6-methoxy-2-dibenzofuranamine, 2-dibenzofuranamine-8-carboxylic acid, 8-nitro-2-dibenzofuranamine or any of the substituted 2-dibenzofuranamines of Example 2 is used in place of 7-fluoro-3-dibenzofuranamine in the above example, the corresponding substituted 2-dibenzofuranol is obtained.

When 3-dibenzofuranamine-6-carboxylic acid, 6-methoxy-3-dibenzofuranamine, 3-dibenzofuranamine-7-carboxylic acid, 7-nitro-3-dibenzofuranamine, 8-bromo-3-dibenzofuranamine, 3-dibenzofuranamine-8-carboxylic acid, 8-methoxy-3-dibenzofuranamine, 8-nitro-3-dibenzofuranamine or any of the substituted 3-dibenzofuranamines of Example 2 is used place of 7-fluoro-3-dibenzofuranamine in the above example, the corresponding substituted 3-dibenzofuranol is obtained.

EXAMPLE 4

7-fluoro-3-hydroxydibenzofuran-2-carboxylic acid 7-fluoro-3-dibenzofuranol (0.05 mole) is dissolved in a solution of potassium hydroxide (0.05 mole) in water (7.5 ml.) and ethanol (18 ml.); the solution is then evaporated to dryness in vacuo.

The thoroughly-dried potassium salt is mixed intimately with anhydrous potassium carbonate (27 g.) and the mixture is heated for 10 hours at 170° C. with dry carbon dioxide at a pressure of 50 atmospheres.

The mixture is taken up in water (750 ml.), and the resulting solution is acidified with hydrochloric acid and chilled thoroughly. 7-Fluoro-3-hydroxydibenzofuran-2-carboxylic acid is collected by filtration washed well with cold water, and recrystallized from aqueous alcohol.

When 6-amino-2-dibenzofuranol, 6-chloro-2-dibenzofuranol, 6-methyl-2-dibenzofuranol, 6,7-dimethyl-2-dibenzofuranol, 7-amino-2-dibenzofuranol, 7-chloro-2-dibenzofuranol, 7-methoxy-2-dibenzofuranol, 7-methyl-2-dibenzofuranol, 7-phenyl-2-dibenzofuranol, 7,8-dichloro-2-dibenzofuranol, 7,8-dimethyl-2-dibenzofuranol, 7,9-dimethyl-2-dibenzofuranol, 8-amino-2-dibenzofuranol, 8-amino-1-methyl-2-dibenzofuranol, 8- chloro-2-dibenzofuranol, 8-methoxy-2-dibenzofuranol, 8-methyl-2-dibenzofuranol, 2-dibenzofuranol-9-carboxylic acid, 9-chloro-2-dibenzofuranol, 9-methoxy-2-dibenzofuranol, 9-methyl-2-dibenzofuranol, 1-methyl-2-dibenzofuranol or any of the substituted 2-dibenzofuranols of Example 3 is used in place of 7-fluoro-3-dibenzofuranol in the above example, the corresponding substituted 2-hydroxydibenzofuran-3-carboxylic acid is obtained.

When 8-chloro-3-dibenzofuranol or any of the substituted 3-dibenzofuranols of Example 3 is used in place of 7-fluoro-3-dibenzofuranol in the above example, 8-chloro-3-hydroxydibenzofuran-2-carboxylic acid, or the corresponding substituted 3-hydroxydibenzofuran-2-carboxylic acid, respectively, is obtained.

EXAMPLE 5

2-amino-4'-fluoro-4-nitrodiphenyl sulfide

A mixture of 2-chloro-5-nitroaniline (10.4 g., 0.06 mole), p-fluorothiophenol (7.7 g., 0.06 mole), potassium hydroxide (3.7 g., 0.066 mole), and 95 percent ethanol (125 ml.) is heated under reflux for 1 hour.

After thorough chilling of the reaction mixture, 2-amino-4'-fluoro-4-nitrodiphenyl sulfide is collected by filtration, and washed with cold 95 percent ethanol. It is purified further by recrystallization from alcohol.

When p-chlorothiophenol, p-methoxybenzenethiol, p-thiocresol, or α,α,α-trifluoro-p-toluenethiol is used in place of p-fluorothiophenol in the above example, 4'-chloro-, 4'-methoxy-, 4'-methyl-, or 4'-trifluoromethyl-2-amino-4-nitrodiphenyl sulfide, respectively, is obtained.

When 2-chloro-4-nitroaniline is used in place of 2-chloro-5-nitroaniline in the above example, 2-amino-4'-fluoro-5-nitrodiphenyl sulfide is obtained.

When 2-chloro-4-nitroaniline is used in the above example together with p-bromothiophenol, p-chlorothiophenol, p-methoxybenzenethiol, p-thiocresol, or α,α,α-trifluoro-p-toluenethiol in place of p-fluorothiophenol, 4'-bromo-, 4'-chloro-, 4'-methoxy-, 4'-methyl-, or 4'-trifluoromethyl-2-amino-5-nitrodiphenyl sulfide, respectively, is obtained.

EXAMPLE 6

8-fluoro-2-nitrodibenzothiophene 2-amino-4'-fluoro-4-nitrodiphenyl sulfide (14.5 g.) is converted into its hydrochloride salt by dissolving in benzene and saturating the solution with dry hydrogen chloride.

After being collected by filtration and dried, the salt (16.2 g., 0.054 mole) is suspended in glacial acetic acid (150 ml.), and treated at 15°–18° with butyl nitrite (6.3 ml). The resulting solution is cooled to ca. 10° and diluted with cold (<15°) aqueous 50 percent acetic acid (600 ml.). The solution is then kept at 10°–15° while copper powder (20 g.) is added slowly. When the addition is complete, the reaction mixture is kept at 10°–15 for an additional 15 minutes, then is warmed to 40° and kept at that temperature for 15 minutes.

Precipitated solids are collected by filtration, washed successively with dilute aqueous sodium hydroxide and with water, and dried. The dry solid is extracted with hot benzene, the solution filtered to remove copper, treated with decolorizing carbon, refiltered, and evaporated to incipient crystallization. After thorough cooling, 8-fluoro-2-nitrodibenzothiophene is collected by filtration, and washed with a little benzene.

When the 4'-substituted 2-amino-4-nitrodiphenyl sulfides of Example 5 are used in place of 2-amimo-4'-fluoro-4-nitrodiphenyl sulfide in the above example, the corresponding 8-substituted 2-nitrodibenzothiophenes are obtained.

When the 4'-substituted 2-amino-5-nitrodiphenyl sulfides of Example 5 are used in place of 2-amino-4'-fluoro-4-nitrodiphenyl sulfide in the above example, the corresponding 8-substituted 3-nitrodibenzothiophenes are obtained.

EXAMPLE 7

7-fluoro-3-nitrodibenzothiophene 7-amino-3-nitrodibenzothiophene is diazotized in aqueous fluoboric acid, and the resulting diazonium fluoborate decomposed thermally according to the procedure of Example 1; 7-fluoro-3-nitrodibenzothiophene is obtained.

When 8-amino-2-nitrodibenzothiophene is used in place of 7-amino-3-nitrodibenzothiophene in the above example, 8-fluoro-2-nitrodibenzothiophene is obtained.

EXAMPLE 8

7-iodo-3-nitrodibenzothiophene

Sodium nitrite (1.6 g., 0.03 mole) is dissolved in concentrated sulfuric acid (16ml.) and the solution is warmed gradually to 70°. The nitrosylsulfuric acid solution so formed is cooled to ca. 15° in an ice-bath, and a solution of 7-amino-3-nitrodibenzothiophene (4.9 g., 0.02 mole) in glacial acetic acid (50 ml.) is added slowly with vigorous stirring. When the addition is complete, the mixture is stirred at 10°–15° for 15 minutes longer, and then is added rapidly to an ice-cold solution of potassium iodide (5.0 g., 0.03 mole) in dilute sulfuric acid. The mixture is heated to boiling to destroy the complex, diluted with water, and chilled thoroughly. The crude 7-iodo-3-nitrodibenzothiophene is collected by filtration, and purified by recrystallization from acetic acid.

When 8-amino-2-nitrodibenzothiophene is used in place of 7-amino-3-nitrodibenzothiophene in the above example, 8-iodo-2-nitrodibenzothiophene is obtained.

When a solution of cuprous bromide in hydrobromic acid is used in place of a solution of potassium iodide in dilute sulfuric acid in the above example, 7-bromo-3-nitrodibenzothiophene is obtained.

When 7-amino-3-nitrodibenzothiophene is diazotized in hydrochloric acid instead of sulfuric acid, and a solution of cuprous chloride in hydrochloric acid is used in place of a solution of potassium iodide in dilute sulfuric acid, 7-chloro-3-nitrodibenzothiophene is obtained.

EXAMPLE 9

8-fluoro-2-nitrodibenzothiophene-5,5-dioxide

A mixture of 8-fluoro-2-nitrodibenzothiophene (14.3 g., 0.058 mole) and glacial acetic acid (200 ml.) is treated slowly with 30% hydrogen peroxide (30 ml., ca. 0.35 mole), the addition being made dropwise and with stirring. The mixture is then warmed gradually to reflux temperature, and refluxed for 1 hour.

After thorough chilling, 8-fluoro-2-nitrodibebenzothiophene-5,5-dioxide is collected by filtration, and washed well with cold water.

When the substituted 2- and 3-nitrodibenzothiophenes of Examples 6, 7, and 8 are used in place of 8-fluoro-2nitrodibenzothiophene in the above example, the corresponding substituted 2- and 3-nitrodibenzothiophene-5,5-dioxides are obtained.

Potassium dichromate may be used in place of hydrogen peroxide as a suitable oxidant for preparation of dibenzothiophene-5,5-dioxides from the corresponding dibenzothiophenes.

EXAMPLE 10

2-amino-8-fluorodibenzothiophene

A mixture of 8-fluoro-2nitrodibenzothiophene (0.04 mole), stannous chloride dihydrate (0.18 mole), concentrated hydrochloric acid (40 ml.), and ethanol (20 ml.) is heated under reflux with stirring for 1 hour.

The mixture is then chilled thoroughly, the amine hydrochloride collected by filtration, and washed with a little cold aqueous ethanol. The free 2-amino-8-fluorodibenzothiophene is liberated by neutralization with aqueous ammonium hydroxide. The amine is collected by filtration, and washed thoroughly with water.

When the substituted 2- and 3- nitrodibenzothiophenes of Examples 6, 7, and 8 are used in place of 8-fluoro-2-nitrodibenzothiophene in the above example, the corresponding substituted 2- and 3-aminodibenzothiophenes are obtained.

Reduction of the nitrodibenzothiophenes may be effected also by means of catalytic hydrogenation in ethanol employing Raney nickel, by means of a mixture of iron filings, ferric chloride and water, or by means of zinc and alcoholic ammonia.

When the substituted 2- and 3- nitrodibenzothiophene-5,5-dioxides of Example 9 are used in place of 8-fluoro--2-nitrodibenzothiophene in the above example, the corresponding substituted 2- and 3- aminodibenzothiophene-5,5-dioxides are obtained.

The alternate methods of reduction applicable to the nitrodibenzothiophenes are not useful for reduction of the nitrodibenzothiophene-5,5-dioxides.

EXAMPLE 11

8-fluoro-2-hydroxydibenzothiophene

To a stirred, ice-cold solution of 2-amino-8-fluorodibenzothiophene (0.010 mole) in acetic acid (20 ml.) and water (60 ml.) are added successively concentrated sulfuric acid (2 ml.) and a solution of sodium nitrite (0.015 mole) in water (10 ml.). The mixture is allowed to warm to room temperature and then is heated gradually to 80° C. and held at that temperature until the evolution of nitrogen ceases.

The mixture is chilled thoroughly and 8-fluoro-2-hydroxydibenzothiophene is collected by filtration, washed well with cold water, and recrystallized from aqueous alcohol.

When 8-bromo-, 8-ethoxy-, or 8-nitro-2-aminodibenzothiophene, or any of the substituted 2-aminodibenzothiophenes of Example 10 is used in place of 2-amino-8-fluorodibenzothiophene in the above example, 8-bromo-,8-ethoxy-, 8-nitro-, or the corresponding substituted 2-hydroxydibenzothiophene, respectively, is obtained.

When 7-nitro-3-aminodibenzothiophene, or any of the substituted 3-aminodibenzothiophenes of Example 10 is used in place of 2-amino-8-fluorodibenzothiophene in the above example, 7-nitro-, or the corresponding substituted 3-hydroxydibenzothiophene, respectively, is obtained.

When 8-ethoxy- or 8-nitro-2-aminodibenzothiophene-5,5-dioxide, or any of the substituted 2-aminodibenzothiophene-5,5-dioxides of Example 10 is used in place of 2-amino-8-fluorodibenzothiophene in the above example, 8-ethoxy-, 8-nitro-, or the corresponding substituted 2-hydroxydibenzothiophene-5,5-dioxide, respectively, is obtained.

When 8-bromo- or 7-nitro-3-aminodibenzothiophene-5,5-dioxide, or any of the substituted 3-aminodibenzothiophene-5,5-dioxides of Example 10 is used in place of 2-amino-8-fluorodibenzothiophene in the above example, 8-bromo-, 7-nitro-, or the corresponding substituted 3 -hydroxydibenzothiophene-5,5-dioxide, respectively, is obtained.

EXAMPLE 12

8-fluoro-2-hydroxydibenzothiophene-3-carboxylic acid 8-fluoro-2-hydroxydibenzothiophene (0.05 mole) is dissolved in a solution of potassium hydroxide (0.05 mole) in water (7.5 ml.) and ethanol (18 ml.); the solution is then evaporated to dryness in vacuo.

The thoroughly dried potassium salt is mixed intimately with anhydrous potassium carbonate (27 g.), and the mixture is heated for 10 hours at 170° C. with dry carbon dioxide at a pressure of 50 atmospheres.

The mixture is taken up in water (750 ml.), and the resulting solution is acidified with hydrochloric acid and chilled thoroughly. 8-fluoro-2-hydroxydibenzothiophene-3-carboxylic acid is collected by filtration, washed well with cold water, and recrystallized from aqueous alcohol.

When the substituted 2-hydroxydibenzothiophenes and 2-hydroxydibenzothiophene-5,5-dioxides of Example 11 are used in place of 8-fluoro-2-hydroxydibenzothiophene in the above example, the corresponding substituted 2-hydroxydibenzothiophene-3-carboxylic acids and 2-hydroxydibenzothiophene-3-carboxylic acid 5,5-dioxides, respectively, are obtained.

When the substituted 3-hydroxydibenzothiophenes and 3-hydroxydibenzothiophene-5,5-dioxides of Example 11 are used in place of 8-fluoro-2-hydroxydibenzothiophene in the above example, the corresponding substituted 3-hydroxydibenzothiophene-2-carboxylic acids and 3-hydroxydibenzothiophene-2-carboxylic acid 5,5-dioxides, respectively, are obtained.

EXAMPLE 13

2-(5'-fluoro-2'-nitrophenyl)benzoquinone 5-fluoro-2-nitroaniline (10.1 g., 0.065 mole) is dissolved by warming in a mixture of concentrated hydrochloric acid (105 ml.) and water (20ml.). The solution is cooled to ca. 5° in an ice-bath, and an ice-cold solution of sodium nitrite (7.5 g., 0.11 mole) in water (20 ml.) is added slowly with stirring. The resulting solution is filtered through glass wool, and then is added dropwise during 30–40 minutes to a vigorously stirred suspension of benzoquinone (8.1 g., 0.075 mole), sodium bicarbonate (80 g.), and water (80 ml.). During the course of the addition, three small additions of hydroquinone are made. The initial reaction temperature is 15°, allowed to rise during the addition to 18°–20°.

When the addition is complete, the reaction mixture is chilled thoroughly, and the 2-(5'-fluoro-2'-nitrophenyl)benzoquinone is collected by filtration and washed with cold water.

When 5-bromo-2-nitroaniline, 5-iodo-2-nitroaniline, or 5-methoxy-2-nitroaniline is used in place of 5-fluoro-2-nitroaniline in the above example, the corresponding 2-(5'-substituted 2'-nitrophenyl)benzoquinone is obtained.

When 4-benzylsulfonyl-2-nitroaniline, 4-bromo-2-nitroaniline, 4-ethyl-2-nitroaniline, 4-fluoro-2-nitroaniline, 4-methylthio-2-nitroaniline, 2,4-dinitroaniline, 3-nitro-4-biphenylamine, α,α,α-trifluoro-2-aniline, 4-trifluoromethylthio-2-nitroaniline or α,α,α-triphenyl-2-nitro-p-toluidine is used in place of 5-fluoro-2-nitroaniline in the above example, the corresponding 2-(4'-substituted 2'-nitrophenyl(benzoquinone is obtained.

When 4,5-dibromo-2-nitroaniline, 4,5-dichloro-2-nitroaniline, 4,5-diethyl-2-nitroaniline, or 4,5-dimethoxy-2-nitroaniline is used in place of 5-fluoro-2-nitroaniline in the above example, the corresponding 2-(4', 5'-disubstituted 2'-nitrophenyl)benzoquinone is obtained.

EXAMPLE 14

2-(2'-amino-5'-fluorophenyl)hydroquinone 2-(5'-fluoro-2'-nitrophenyl)benzoquinone (6.2 g. 0.025 mole) is suspended in a mixture of ethanol (300 ml.) and concentrated hydrochloric acid (6 ml.), and hydrogenated in the presence of 10 percent palladium on charcoal (6 g.).

The mixture is filtered, and the filtrate is evaporated in vacuo almost to dryness. The residue is triturated with a little water, and then is treated dropwise, with stirring with a solution of sodium bicarbonate (5 g.) in water (30 ml.) which also contains a little sodium bisulphite. The resulting mixture is extracted repeatedly with ether, the combined extracts dried over anhydrous sodium sulfate containing a little sodium bisulfite, filtered, and evaporated in vacuo to give 2-(2'-amino-5'-fluorophenyl)hydroquinone. The crude product is purified by recrystallization from chlorobenzene.

When the substituted 2-(2'-nitrophenyl)benzoquinones of Example 13 are used in place of 2 -(5'-fluoro-2'-nitrophenyl)benzoquinone in the above example, the corresponding substituted 2-(2'-aminophenyl)hydroquinones are obtained.

EXAMPLE 15

6-fluoro-3-hydroxycarbazole

A solution of 2-(2'-amino-5'-fluorophenyl)hydroquinone (4.4 g., 0.02 mole) in ethanol (125 ml.) is treated with a small quantity of ferric chloride, and the mixture is refluxed briefly.

The mixture is treated with activated charcoal, filtered, and the filtrate evaporated in vacuo to give 6-fluoro-3-hydroxycarbazole. The crude product is conveniently purified by recrystallization from aqueous acetic acid.

When the 2-(5'-substituted 2'-aminophenyl)hydroquinones of Example 14 are used in place of 2-(2'-amino-5'-fluorophenyl)hydroquinone in the above example, the corresponding 6-substituted 3-hydroxycarbazoles are obtained.

When the 2-(4'substituted 2'-aminophenyl)hydroquinones of Example 14 are used in place of 2-(2'-amino- 5'-fluorophenyl)hydroquinone in the above example, the corresponding 7-substituted 3-hydroxycarbazoles are obtained.

When the 2-(4',5'-disubstituted 2'-aminophenyl) hydroquinones of Example 14 are used in place of 2-(2'-amino-5'-fluorophenyl)hydroquinone in the above example, the corresponding 6,7-disubstituted 3-hydroxycarbazoles are obtained.

EXAMPLE 16

7-ethyl-3-hydroxycarbazole 2-(4'-ethyl-2'-nitrophenyl)benzoquinone (10.3 g., 0.04 mole) is suspended in ethanol (350 ml.), and hydrogenated in the presence of Raney nickel catalyst.

The mixture is filtered, and the filtrate is evaporated in vacuo to give 7-ethyl-3-hydroxycarbazole. The product is purified by recrystallization from aqueous acetic acid.

When the 2-(4'-substituted, 5'-substituted, and 4'5'-disubstituted 2'-nitrophenyl)benzoquinones of Example 13 are used in place of 2-(4'-ethyl-2'-nitrophenyl) benzoquinone in the above example, the corresponding 7-substituted, 6-substituted, and 6,7-disubstituted 3-hydroxycarbzoles, respectively, are obtained.

When the substituted 2-(2'-nitrophenyl)benzoquinones of Example 13 are treated in aqueous methanol for 2–3 hours with sulfur dioxide, the corresponding substituted 2-(2'-nitrophenyl)hydroquinones are obtained.

When the latter are used in place of 2-(4'-ethyl-2'-nitrophenyl)benzoquinone in the above example, the substituted 3-hydroxycarbazoles are obtained.

EXAMPLE 17

6-fluoro-3-hydroxycarbazole-2-carboxylic acid 6-fluoro-3-hydroxycarbazole is carbonated according to the procedure of Example 4; 6-fluoro-3-hydroxycarbazole-2-carboxylic acid is obtained.

When 6-amino-, 6-chloro, 6-methyl-, 6-nitro-, or any of the 6-substituted 3-hydroxycarbazoles of Examples 15 and 16 is used in place of 6-fluoro-3-hydroxycarbazole in the above example, the corresponding 6-substituted 3-hydroxycarbazole-2-carboxylic acid is obtained.

When 7-chloro-, 7-methoxy-, 7-methyl-, or any of the 7-substituted 3-hydroxycarbazoles of Examples 15 and 16 is used in place of 6-fluoro-3-hydroxycarbazole in the above example, the corresponding 7-substituted 3-hydroxycarbazole-2-carboxylic acid is obtained.

When the 6,7-disubstituted 3-hydrocycarbazoles of Examples 15 and 16 are used in place of 6-fluoro-3-hydroxycarbazole in the above example, the corresponding 6,7-disubstituted 3-hydroxycarbazole-2-carboxylic acids are obtained.

EXAMPLE 18

Methyl 7-fluoro-3-hydroxydibenzofuran-2-carboxylate

To a mixture of 7-fluoro-3-hydroxydibenzofuran-2-carboxylic acid (0.015 mole) and absolute methanol (6.1 ml., 0.15 mole) is added, slowly with stirring, 0.6 ml. of concentrated sulfuric acid. The mixture is then heated under reflux for 8 hours. The excess methanol is removed by evaporation in vacuo and the residue is treated with stirring with 25 ml. of ice-water. The methyl 7-fluoro-3-hydroxydibenzofuran-2-carboxylate is collected by filtration, washed thoroughly with cold water and dried. It is purified by recrystallization from aqueous alcohol.

When ethanol, propanol, isopropanol, butanol, isobutanol or benzyl alcohol is used in place of methanol in the procedure described above, the corresponding ester is obtained.

When the o-hydroxydibenzofuran, o-hydroxydibenzothiophene and o-hydroxycarbazole carboxylic acids of this invention are used in place of 7-fluoro-3-hydroxydibenzofuran-2-carboxylic acid, the corresponding esters are obtained.

EXAMPLE 19

7-fluoro-3-hydroxycarbazole-2-carboxamide

A mixture of 7-fluoro-3-hydroxycarbazole-2-carboxylic acid (0.003 mole), anhydrous benzene (30 ml.), and thionyl chloride (0.0033 mole) is refluxed for 1 ½ hours and then is added gradually to a vigorously-stirred, ice-cooled solution of ammonium hydroxide (75 ml.). The mixture is allowed to warm to room temperature, the benzene is removed under a stream of nitrogen, and the precipitated 7-fluoro-3-hydroxycarbazole-2-carboxamide is collected and dried.

When aqueous methyl-, dimethyl-, ethyl-, or diethylamine, piperidine, morpholine or pyrrolidine is used in place of ammonia in the above reaction, the corresponding substituted amide is obtained.

When the o-hydroxydibenzofuran, o-hydroxydibenzothiophene and o-hydroxycarbazole carboxylic acids of this invention are used in place of 7-fluoro-3-hydroxycarbazole-2-carboxylic acid, the corresponding amides are obtained.

EXAMPLE 20

7-fluoro-2-methoxydibenzothiophene-3-carboxylic acid

Methyl 7-fluoro-2-hydroxydibenzothiophene-3-carboxylate (0.010 mole), sodium (230 mg., 0.010 g. atom) in anhydrous methanol (10 ml.), and methyl iodide (1.6 g., 0.011 mole) are heated together under reflux for several hours. The methanol is removed by evaporation in vacuo and the residue is treated with 25 ml. of water. The mixture is rendered alkaline with sodium hydroxide to ensure dissolution of unaltered starting material, and then is extracted twice with 25 ml. portions of ether. The combined ethereal extracts are dried over anhydrous magnesium sulfate and evaporated in vacuo to give methyl 7-fluoro-2-methoxydibenzothiophene-3-carboxylate.

The ester is hydrolyzed under reflux by potassium hydroxide (0.7 g., 0.0125 mole) in alcohol (12.5 ml.) The solution is evaporated to dryness in vacuo and the residue taken up in 25 ml. of water. The aqueous solution is filtered and the filtrate acidified with hydrochloric acid. The precipitated 7-fluoro-2-methoxydibenzothiophene-3-carboxylic acid is collected by filtration and recrystallized from alcohol.

When ethyl iodide, propyl iodide butyl iodide, t-butyl iodide, vinyl bromide, or benzyl chloride are used in place of methyl iodide in the procedure described above, the corresponding alkoxy derivative is prepared.

When the o-hydroxydibenzofuran, o-hydroxydibenzothiophene and o-hydroxycarbazole carboxylic acid esters of this invention are used in place of methyl 7-fluoro-2-hydroxydibenzothiophene-3-carboxylate, the corresponding alkoxy derivatives are obtained.

EXAMPLE 21

6-fluoro-3-acetoxycarbazole-2-carboxylic acid

To a mixture of 6-fluoro-3-hydroxycarbazole-2-carboxylic acid (0.008 mole) in anhydrous pyridine (3 ml.) is added acetic anhydride (5.6 ml.), and the resultant mixture is heated on the steam cone for 1.5 hours. The mixture is kept free from moixture during this time. On cooling, the mixture is added to a stirred 100 ml. portion of water, the aqueous system extracted with ether, the ether layers washed with 1N hydrochloric acid and water, and then dried over anhydrous magnesium sulfate. Concentrating the filtered ether solution yields 6-fluoro-3-acetoxycarbazole-2-carboxylic acid.

When propionic anhydride, butyric anhydride, isobutyric anhydride, valeric anhydride, benzoic anhydride, or phenylacetic anhydride is used in place of acetic anhydride in the procedure described above, the corresponding acyloxy derivative is obtained.

When the o-hydroxydibenzofuran, o-hydroxydibenzothiophene and o-hydroxycarbazole carboxylic acids of this invention are used in place of 6-fluoro-3-hydroxycarbazole-2-carboxylic acid, the corresponding acyloxy derivatives are obtained.

EXAMPLE 22

Sodium 7-fluoro-2-hydroxycarbazole-3-carboxylate

To a solution of sodium hydroxide (0.001 mole) in water (15 ml.) is added a solution of 7-fluoro-2-hydroxycarbazole-3-carboxylic acid (0.001 mole) in ethanol, the mixture stirred and gently heated for 2 hours, and the solvents removed in vacuo on a rotary evaporator to yield sodium 7-fluoro-2-hydroxycarbazole-3-carboxylate.

When potassium hydroxide is used in place of sodium hydroxide in the above example, the corresponding potassium salt is obtained.

When the other o-hydroxydibenzofuran, o-hydroxydibenzothiophene, and o-hydroxycarbazole carboxylic acids of this invention are used in place of 7-fluoro-2-hydroxycarbazole-3-carboxylic acid, the corresponding salts are obtained.

We claim:

1. A method of treating inflammation which comprises administering to a host 1 mg. to 100 mg. per kg. body weight per day of a compound of the formula:

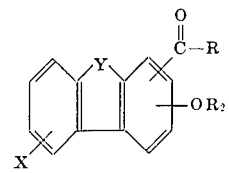

wherein:
X is halogen,
Y is oxy,
R is hydroxy, lower alkoxy, aminoloweralkylamino, or di(lower alkyl)amino and
$R_2$ is hydrogen or loweralkanoyl; provided that the $OR_2$ group and the —COR group are interchangeably substituted on the 2 and 3 position.

2. A method of treating inflammation which comprises administering to a host 1 mg. to 100 mg. per kg. body weight per day of 7-fluoro-3-hydroxydibenzofuran-2-carboxylic acid.

3. A method of treating inflammation which comprises administering to a host 1 mg. to 100 mg. per kg. body weight per day of 8-fluoro-2-hydroxydibenzofuran-3-carboxylic acid.

* * * * *